United States Patent [19]
Bochot

[11] Patent Number: 5,826,689
[45] Date of Patent: Oct. 27, 1998

[54] CLUTCH COVER AND CLUTCH COMPRISING SUCH A COVER

[75] Inventor: Jean-Claude Bochot, Claye-Souilly, France

[73] Assignee: Valeo, Paris, France

[21] Appl. No.: 637,660

[22] PCT Filed: Aug. 25, 1995

[86] PCT No.: PCT/FR95/01124

§ 371 Date: Apr. 29, 1996

§ 102(e) Date: Apr. 29, 1996

[87] PCT Pub. No.: WO96/07037

PCT Pub. Date: Mar. 7, 1996

[30] Foreign Application Priority Data

Aug. 29, 1994 [FR] France .................................. 94 10375

[51] Int. Cl.⁶ .............................. F16F 15/12; F16D 13/60
[52] U.S. Cl. .................. 192/70.17; 74/574; 192/214; 192/113.23; 192/113.4; 464/17; 464/68
[58] Field of Search ..................... 192/212, 214, 192/113.23, 113.4, 70.17; 74/574; 464/17, 68

[56] References Cited

U.S. PATENT DOCUMENTS

| 5,111,714 | 5/1992 | Honoki et al. .......................... 74/574 |
| 5,146,811 | 9/1992 | Jackel ........................................ 74/574 |
| 5,156,067 | 10/1992 | Umiyama ................................... 74/574 |
| 5,194,044 | 3/1993 | Jackel et al. ........................... 74/574 X |
| 5,279,182 | 1/1994 | Fukushima ............................ 74/574 X |
| 5,368,146 | 11/1994 | Kohno et al. .................... 192/113.4 X |
| 5,597,059 | 1/1997 | Gebauer et al. ............... 192/113.23 X |
| 5,669,478 | 9/1997 | Schierling et al. ................... 464/68 X |

FOREIGN PATENT DOCUMENTS

| 0427983 | 5/1991 | European Pat. Off. . |
| 2687749 | 8/1993 | France . |
| 2690722 | 11/1993 | France . |
| 3815505 | 12/1988 | Germany . |
| 4127438 | 3/1993 | Germany . |
| 2244543 | 12/1991 | United Kingdom . |

OTHER PUBLICATIONS

Patent Abstracts of Japan vol. 18 No. 123 (M–1569), 28 Feb. 1994; JP A–53–12,053 22 Nov. 1993.

*Primary Examiner*—Rodney H. Bonck
*Attorney, Agent, or Firm*—Longacre & White

[57] ABSTRACT

A torsion damper having two coaxial masses defined by a first mass (12) and a second mass (14). The second mass (14) includes a damper plate (28) fixed to the first mass (12). An annular ventilation space (48) is formed between a second platen (27) of the second mass (14) and the damper plate (28) to enhance cooling.

6 Claims, 1 Drawing Sheet

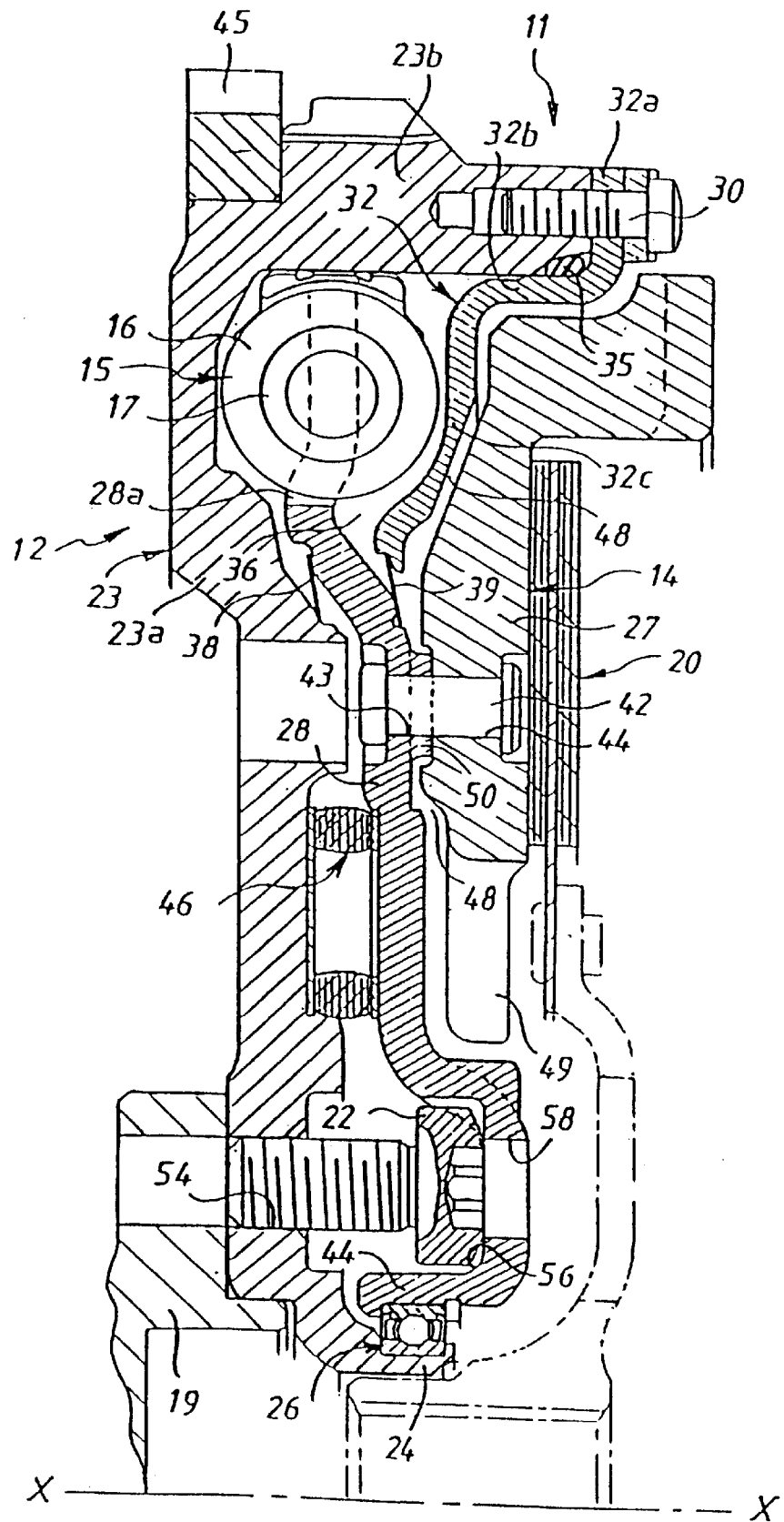

5,826,689

CLUTCH COVER AND CLUTCH COMPRISING SUCH A COVER

BACKGROUND OF THE INVENTION

1. Field of the Invention

This invention relates to a torsion damper, especially a double damped flywheel constituting a torque transmitting device for a motor vehicle, and of the type comprising two coaxial masses which are mounted for circumferential movement of one with respect to the other against the action of circumferentially acting resilient means; more particularly, the invention relates to an improvement in such a device which enables a forced flow of air to be obtained between parts of the two coaxial masses, thus ensuring that it is cooled.

2. Description of the Prior Art

A torsion damper of the kind defined above is known, which comprises a first mass having a first platen adapted to be fixed to a driving shaft, such as for example the crankshaft of the engine of a motor vehicle, and a second mass comprising an annular second platen, together with a disc fixed to the latter in facing relationship with the said first mass and so configured as to constitute a damper plate for actuating circumferentially acting resilient means arranged between the two masses. The first mass is configured with a hub which is equipped with a rotary bearing, generally a ball bearing, on which the said second mass is mounted. The latter defines a platen which is adapted to constitute the reaction plate of a friction clutch, mounted in axial extension of the torsion damper. The clutch enables the second mass of this torsion damper to be coupled selectively to a driven shaft, such as for example the input shaft of a gearbox.

Such an arrangement is described for example in the document FR 2 662 760 (GB-A-2 244 543). In addition, in a known system of this kind, the bearing is disposed on a diameter smaller than the pitch circle diameter of the holes for the screw fasteners securing the said first mass on the driving shaft. The second mass has through holes in register with the threaded holes.

The invention relates to an improvement which is applicable in particular to the type of torsion damper described above, and which enables effective cooling of the latter to be obtained by forced circulation of air which flows radially outwardly between certain elements of the assembly.

SUMMARY OF THE INVENTION

More precisely, the invention provides a torsion damper, especially for a motor vehicle, comprising two coaxial masses mounted for circumferential movement of one with respect to the other against the action of circumferentially acting resilient means, namely, respectively, a first mass comprising a first platen adapted to be fixed to a driving shaft, and a second mass comprising an annular second platen adapted to constitute the reaction plate of a clutch and offering a friction surface to the clutch friction wheel comprised in the said clutch, and a disc fixed to the latter in facing relationship with the said first mass by means of rivets or analogous fastening means, the said disc constituting a damper plate for actuation of the said resilient means, wherein the said first mass is configured with a hub which is equipped with a bearing for rotation of the said second mass, and wherein an axial spacing means is interposed between the second platen and the damper plate around each rivet or analogous fastening means, characterised in that the damper plate is of press-formed metal plate and is extended radially inwardly by a cylindrical sleeve, in that the said bearing is fitted between the said cylindrical sleeve and the said hub, and in that an annular ventilation space is defined, firstly between the said second platen and the said damper plate in its radially innermost part, and secondly, between the said second platen and the said first mass in its radially outermost part.

Thanks to the invention, the second platen, which typically constitutes the reaction plate of a friction clutch, is well cooled. The bearing is thus cooled, since less heat is transmitted to it.

In addition, the second platen is simplified, and the disc performs several functions in a simple and inexpensive way.

The arrangement in accordance with the invention enables dry friction means to be interposed between the first mass and the disc that constitutes the damper plate. This disc has a serpentine form in order to reduce overall size.

The invention is applicable, with advantage, to a torsion damper of the type defined above in which the said first mass comprises a disc fixed to the outer periphery of the first platen and extending radially inwardly, so as to define with this platen an annular chamber which encloses the said resilient means.

The damper plate of the second mass is so configured as to engage in this annular chamber, and the latter is sealingly closed by means of resilient sealing rings, one of which is mounted between the first platen and the damper plate, the other being mounted between the damper plate and the disc fixed to the outer periphery of the said first platen. A sealed annular chamber of this kind is partly filled with grease for the lubrication of the springs of the circumferentially acting resilient means mentioned above. Since the second platen is cooled, the grease will become heated to a lesser extent.

In such an embodiment, the radially outermost part of the annular ventilation space is defined between the disc of the said first mass and the said second platen. The latter may preferably have slots at its inner periphery, so configured as to induce forced circulation of air in the said annular ventilation passage, radially towards the outside of the latter. Assembly between the said second platen and its damper plate is obtained by means of rivets or analogous fastening means, and in that case, in order to maintain the continuity of the annular ventilation space, there is provided around each rivet an axial spacing means interposed between the said second platen and its disc. The spacing means may comprise a boss formed in the damper plate and made by press forming around the hole formed in the disc for passage of the corresponding rivet.

The invention will be more clearly understood, and further advantages thereof will appear more clearly, in the light of the following description of a torsion damper which constitutes a torque transmitter in accordance with the invention, given by way of example only and made with reference to the attached drawings, in which:

BRIEF DESCRIPTION OF THE DRAWINGS

The single FIGURE is an axial cross section of one half of a double damped flywheel in accordance with the invention.

DETAILED DESCRIPTION OF THE PREFERRED EMBODIMENT

The drawing shows a mechanism in the form of a double damped flywheel 11 for a motor vehicle, comprising two coaxial masses 12, 14 which are mounted for circumferential movement of one with respect to the other about a common axis of rotation XX, against the action of circumferentially acting resilient damping means 15, which consist of several sets of helical springs which are spaced apart at regular intervals circumferentially.

In this example, each set consists of two helical springs 16, 17 of different diameters and stiffnesses, the diameters being such that the spring 17 is mounted within the spring 16. The axis XX is also the axis of rotation of a driving shaft 19, which is here the crankshaft of an internal combustion engine, of a friction clutch the clutch friction wheel 20 of which is shown, and of an input shaft of a gearbox not shown. The first rotating mass 12 is connected to the driving shaft 19 by means of studs 22 which are situated close to its inner periphery. It includes a plate in the form of a casting, which is henceforth referred to herein as the first platen 23. The second rotating mass 14 is coupled in a disengageable manner, through a clutch mechanism and the clutch friction wheel 20, to a driven shaft which in this example is the input shaft of the gearbox. The second mass 14 is mounted for rotation on a tubular central hub 24 of the first mass, through an interposed rotary bearing 26 which in this example consists of a ball bearing. The second mass 14 includes an annular plate which will be referred to from hereon as the second platen 27, together with a disc 28 which is fixed to the latter and which faces towards the said first mass. In the manner known per se, the platen 27 constitutes the reaction plate of a friction clutch, and offers a friction surface to the appropriate friction liner of the clutch wheel 20. The disc 28 constitutes a damper plate for actuation of the said resilient means.

At its outer periphery it includes lugs 28a, which are adapted to bias the springs through the ends of the latter during relative rotation between the said first and second masses. At their other ends, the springs bear on abutments, not shown, which are fixed to the said first mass. The said first platen 23 comprises a radial annular portion 23a which is extended at its outer periphery by an axial cylindrical skirt 23b, with a baffle disc 32 of press-formed metal plate being fixed to its free end by means of studs 30. The portion 23a is extended at its inner periphery by the hub 24, which is integral with the latter.

As can be seen in the drawing, the disc 32, which is fixed to the outer periphery of the first platen 23, comprises, going from the outside towards the inside, a radial annular portion 32a which is applied against the end of the cast skirt 23b, a cylindrical portion 32b which extends along the inner face of the skirt, and a substantially radial portion 32c which extends inwardly so as to define, with the annular portion 23a of the first platen and the said skirt 23b, the major part of an annular chamber 36 which encloses the resilient means 15 and also the lugs 28a of the disc 28. The portion 32c is embossed locally for engagement with the ends of the springs 16, 17, the portion 23a having, in facing relationship with the said embossed portions and the lugs 23a, bosses, for example in the form of attached components, for engagement with the circumferential ends of the springs 16, 17. The said embossed portions and the said bosses can be seen for example in the document WO-A-95/17617 (FIG. 1), to which reference can be made. The annular chamber 36 is enclosed sealingly on its radially inward side by two sealing rings 38, 39 which are compressed axially between the disc 28 that constitutes the damper plate and elements of the said first mass 12. More particularly, a ring 38 is mounted in axial compression between a conical surface of the first platen 23 and an annular recess in the damper plate 28, while a ring 39 is mounted in axial compression between an annular recess in the disc 28 constituting the damper plate, on the other face of the latter, and an annular recess which is formed on the inner circular edge of the disc 32 of the said first mass. An annular sealing ring 35 is inserted between the end of the skirt 23b and the disc 32 secured to the latter. Thanks to this sealed mounting, it is possible to partly fill the annular chamber 36 with grease in order to lubricate the springs of the circumferentially acting resilient means.

Fastening of the disc 28 constituting the damper plate, to the said second platen 27, is obtained by means of rivets 42 which are spaced apart at regular intervals circumferentially and which are engaged in holes 43 in the disc and in holes 44 in the second platen 27.

As shown, the latter constitutes the reaction plate for the clutch friction wheel 20.

In this example, the rivets 42 are fitted radially through the friction surface offered by the second platen 27 to the appropriate friction liner 20 of the clutch friction wheel.

A toothed crown, i.e. a so-called starter crown 45 which is arranged to be driven by a starter not shown, is fixed to the outer periphery of the first mass, in the region of the junction between the said first platen 23a and the skirt 23b which extends it externally.

The first mass does of course have holes (not given reference numerals) which are in register with the holes 44, so as to enable the disc 28 to be fastened.

In accordance with a significant feature of the invention, the damper plate 28, which is of press-formed metal plate, is extended radially inwardly well beyond the rivets 42 by which it is fastened to the said second platen 27, so that the rotary bearing 26 (i.e. the ball bearing mentioned above) is in fact fitted between the hub 24 of the said first platen, which is part of the first mass, and a cylindrical sleeve 44 formed on the damper plate 28 at its inner periphery. The sleeve 44 surrounds the free end of the hub 24. This sleeve 44 is shouldered and has a groove in which a circlip is fitted for retaining the outer ring of the bearing 26 in place.

Similarly, the hub 24 is shouldered and is upset at its free end so as to retain the inner ring of the bearing 26 in position.

In addition, an annular ventilation space 48 is defined, firstly between the said second platen 27 which is part of the said second mass 14 and the said damper plate 28, in the radially innermost part of the latter, and secondly, between the said second platen 27 and the said first mass 12 in its radially outermost part. More precisely, in the particular type of torsion damper which is described, comprising a sealed annular chamber 36 enclosing the resilient means, the radially outermost part of the annular ventilation space 48 is defined between the disc 32 of the said first mass and the said second platen 27. It is also apparent that the ring 39 isolates the annular ventilation space 48 from the annular chamber 36. In addition, the said second platen 27 has slots 49 at its inner periphery, which are so configured as to induce a flow of air in the annular ventilation space 48, radially towards the outside of the latter. The slots 49 lie radially inwardly of the friction liners of the friction wheel 20, that is to say inwardly of the friction surface of the platen 27. In order to maintain the continuity of the annular ventilation space from the inside to the outside, an axial spacing means is interposed between the said second platen 27 and its disc 28, around each rivet 42. These axial spacing means are situated, like the rivets 42, radially inwardly of the sealing ring 38, 39 and the chamber 36, with the rivets 42, or analagous fastening means, being fitted generally radially inwardly of the mean diameter of the friction liners of the clutch wheel 20.

In this example, this spacing means consists of a boss 50 of the damper plate 28 of the said second mass. This boss is press-formed around the hole 43 which is formed for passage of the corresponding rivet 42. In a modified version, the boss may be made integrally by casting with the reaction plate 27. In another modified version, the spacer may be an independent component, for example a thermal insulating ring, which is mounted on the rivet and which enables the temperature in the region of the bearing 26 and chamber 36 to be further reduced.

In addition, dry friction means 46 are interposed between the said first platen 23 of the said first mass and the said disc 28 that constitutes the damper plate.

Such an arrangement is described in the document FR 2 687 749.

In another version, the friction means may be of the same type as those described in the document WO-A-95/17617 mentioned above, and may comprise a friction ring which is adhesively bonded on to a thrust ring having axial lugs which penetrate into it, together with a resilient ring, for example of the Belleville type.

Finally, it should be noted that the studs 22 for fastening the torsion damper are engaged in holes 54 in the first platen of the said first mass, but that they are held captive between the first platen 23 and the damper plate 28 of the said second mass, in a zone lying radially between the bearing and the inner periphery of the second platen 27.

To this end, the said damper plate 28 is formed with pressed-out zones 56 in which the heads of the studs 22 are received. These zones include holes 58 in register with the seatings for the stud heads (when the two masses are not impelled into rotation of one with respect to the other), through which a tool can be introduced for fastening the damped flywheel to the crankshaft, the rotary bearing 26 being situated on a diameter which is smaller than the pitch circle diameter of the studs 22, the holes 58 being in axial register with the threaded holes 54 for the studs 22.

It will be noted that the clutch wheel 20 has a hub which penetrates into the sleeve 24. The hub is splined internally so as to couple it in rotation with the input shaft of the gearbox mentioned above. The hub is extended by an integral support plate which is formed with a plurality of holes in register with the holes 54, 58. At its outer periphery, this support plate is extended by a support disc which is secured by riveting on the support plate, and which has the friction liners themselves fastened on each of its faces in the manner known per se, so that they are gripped releasably between the reaction plate 27 and a pressure plate (not shown), which is part of the clutch mechanism (not shown) attached through its cover plate on the platen 27, which may attain quite high temperatures. The support plate of the friction wheel 20 may have fins for improving ventilation.

When the whole of the damped flywheel is driven in rotation, it will be clear in the light of the foregoing description that a forced flow of air, flowing radially outwardly, is induced in the annular ventilation space 48 described above. This air flow enables the elements of the torsion damped flywheel, and in particular the reaction plate 27, to be effectively cooled.

It will be noted that the press-formed zones 56 and the holes 58 also assist ventilation. The present invention is of course not limited to the embodiment described.

For example, the rivets 42 may be replaced by screws or hollow rivets engaged in a blind hole formed in the reaction plate 27, in the manner disclosed in FIG. 1 of the document FR-A-96 62 760.

In another version, the rivets 42 may be replaced by pins having a head engaged in blind holes in the reaction plate 27, the friction surface of which is then continuous.

Thus the damper plate 28 is fixed to the reaction plate 27 by means of rivets 42 or analagous fastening means.

Finally, the bearing 26 may be a plain bearing or a bearing having two ball races.

It will be appreciated that the disc 28 has a serpentine profile. This disc 28 has, radially outwards of the bosses 50, an inclined zone which enables the sealing rings 38, 39 to be put under precompression, and enables the springs 16, 17 to be offset axially so as to reduce the overall axial size of the torsion damper.

The press-formed zones 56 and the lugs 28a lie axially on either side of the bosses 50. The reaction plate 27 can thus be simplified. The slots 49 do of course lie radially outside the press-formed zones 56, being in the present case aligned radially with the said zones 56.

A torsion damper having two coaxial masses defined by a first mass (12) and a second mass (14). The second mass (14) includes a damper plate (28) fixed to the first mass (12). An annular ventilation space (48) is formed between a second platen (27) of the second mass (14) and the damper plate (28) to enhance cooling.

I claim:

1. A torsion damper for a clutch having a reaction plate and a friction wheel, the torsion damper comprising: two coaxial masses (12, 14) mounted for circumferential movement of one with respect to the other against the action of circumferentially acting resilient means (16, 17), namely, respectively, a first mass (12) comprising a first platen (23) adapted to be fixed to a driving shaft, and a second mass (14) comprising an annular second platen (27) adapted to constitute the reaction plate of the clutch and offering a friction surface to the clutch friction wheel of said clutch, and a disc (28) fixed to the annular second platen (27) in facing relationship with the first mass by means of fastening means (42), the disc (28) constituting a damper plate for actuation of the resilient means, wherein the first mass (12) is configured with a hub (24) which is equipped with a bearing (26) for permitting rotation of the second mass, and wherein an axial spacing means (50) is interposed between the second platen (27) and the damper plate (28) around each fastening means, characterised in that the damper plate (28) is of press-formed metal plate and is extended radially inwardly with respect to the spacing means by a cylindrical sleeve (44), in that the bearing (26) is fitted between the cylindrical sleeve (44) and the hub (24), and in that an annular ventilation space (48) is defined, firstly between the second platen (27) and the damper plate (28) in its radially innermost part, and secondly, between the second platen (27) and the first mass (12) in its radially outermost part.

2. A torsion damper according to claim 1, wherein the first mass (12) comprises a disc (32) fixed to the outer periphery of the first platen (23) and extending radially inwardly so as to define with it an annular chamber (36) enclosing the resilient means (15), and in that the radially outermost part of the annular ventilation space (48) is defined between the disc (32) of the first mass and the second platen (27).

3. A torsion damper according to claim 2, wherein that the said second platen (27) has slots (49) at its inner periphery radially inwardly with respect to the spacing means.

4. A torsion damper according to claim 3, wherein the annular chamber (36) is sealingly closed on its radially inward side by a ring (39) which isolates the annular ventilation space (48) from the annular chamber (36), said ring (39) being located radially outwardly with respect to the spacing means.

5. A torsion damper according to claim 1, wherein the fastening means (42) are in the form of rivets and each of said spacing means comprises a boss (50) of the disc (28) of the second mass, defined around the hole formed in the disc for passage of a corresponding rivet.

6. A torsion damper for a clutch having a reaction plate and a friction wheel, the torsion damper comprising: two coaxial masses (12, 14) mounted for circumferential movement of one with respect to the other against the action of circumferentially acting resilient means (16, 17), namely, respectively, a first mass (12) comprising a first platen (23) adapted to be fixed to a driving shaft, and a second mass (14) comprising an annular second platen (27) adapted to constitute the reaction plate of the clutch and offering a friction surface to the clutch friction wheel of said clutch, and a disc (28) fixed to the annular second platen (27) in facing relationship with the first mass by means of fastening means (42), the disc (28) constituting a damper plate for actuation of the resilient means, wherein the first mass (12) is configured with a hub (24) which is equipped with a bearing (26) for permitting rotation of the second mass, and wherein an axial spacing means (50) is interposed between the second platen (27) and the damper plate (28) around each fastening means, characterised in that the damper plate (28) is of press-formed metal plate and is extended radially inwardly with respect to the spacing means by a cylindrical sleeve (44), in that the bearing (26) is fitted between the cylindrical sleeve (44) and the hub (24), and in that an annular ventilation space (48) is defined, firstly between the second platen (27) and the damper plate (28) in its radially innermost part, and secondly, between the second platen (27) and the first mass (12) in its radially outermost part and screw fasteners (22) are engaged in holes (54) in the first platen, in that they are held captive between the first platen and the disc (28) of the second mass, in a zone lying radially between the bearing and the inner periphery of the second platen, and in that holes (58) are formed in the disc in facing relationship with seatings for the heads of the screw fasteners.

* * * * *